United States Patent Office 3,409,827
Patented Nov. 5, 1968

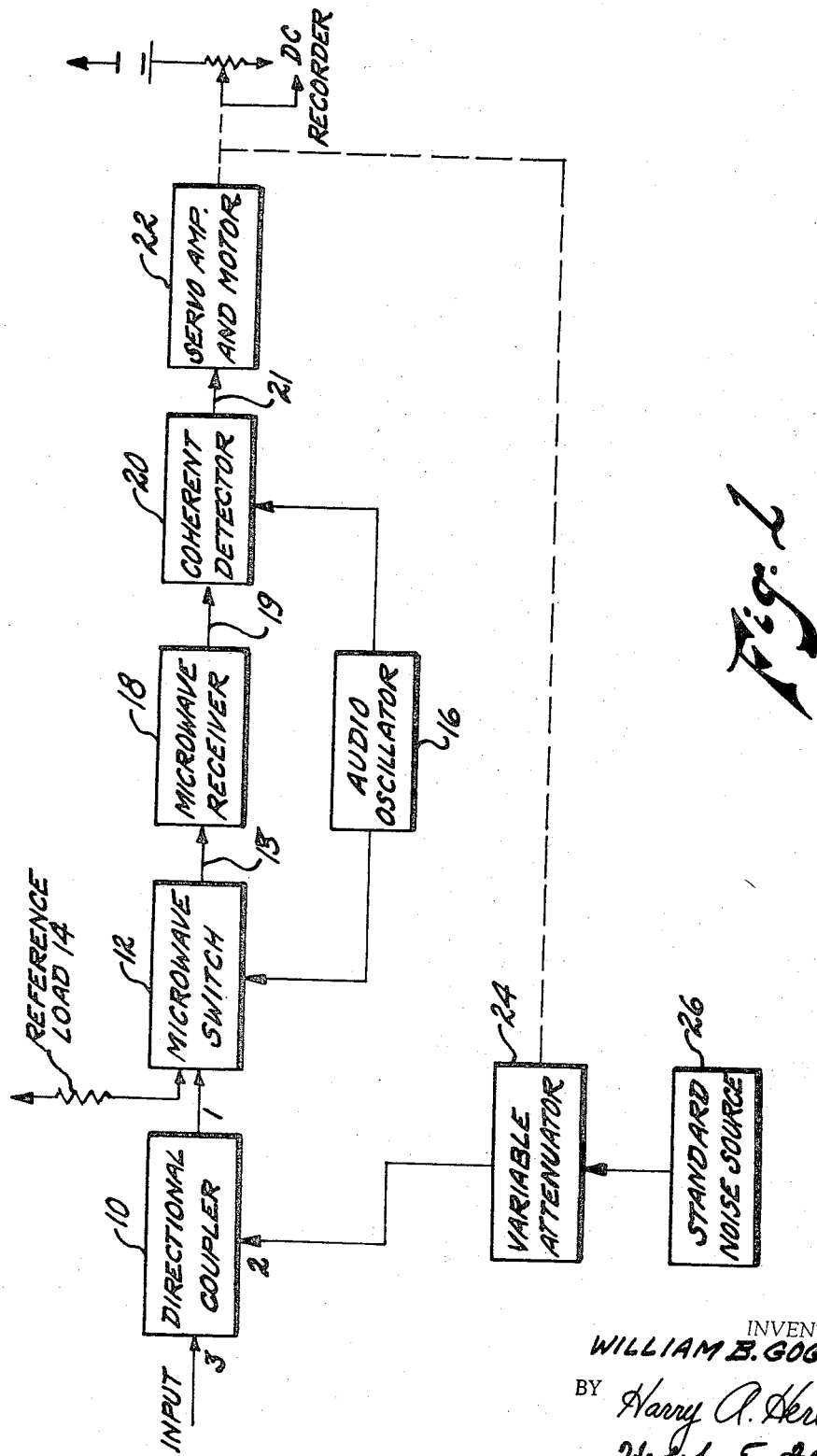

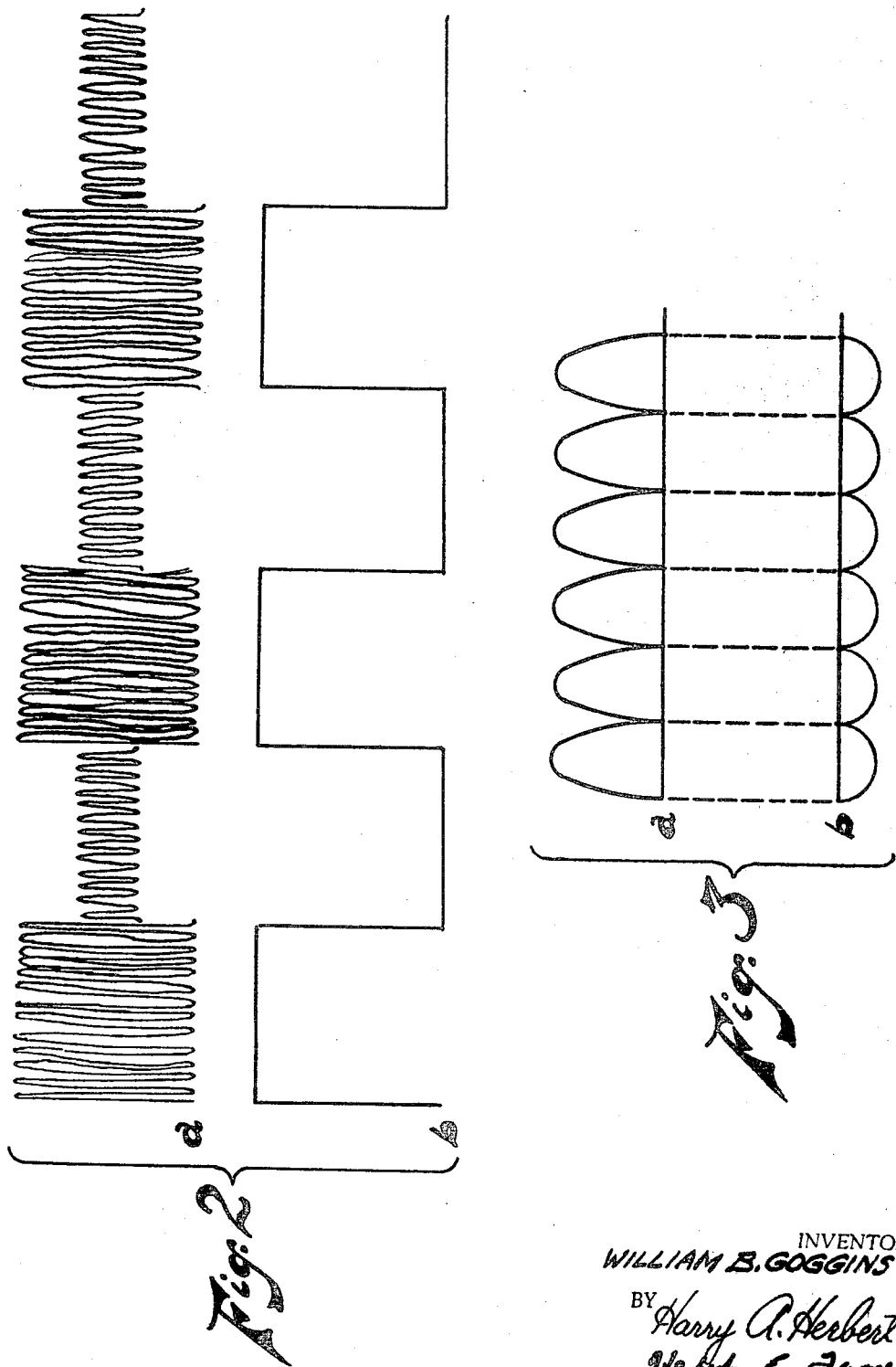

3,409,827
FEEDBACK-STABILIZED MICROWAVE RADIOMETER
William B. Goggins, Jr., Chelmsford, Mass., assignor to the United States of America as represented by the Secretary of the Air Force
Filed July 22, 1965, Ser. No. 474,191
7 Claims. (Cl. 324—58.5)

ABSTRACT OF THE DISCLOSURE

A microwave radiometer utilizing a gain-stabilizing feed-back loop which modifies the total energy received from cartain celestial bodies or radio stars by adding a regulatory noise increment whose magnitude is adjustably metered by the servo action of a motor-driven attenuator. A coherent detector senses and compensates for any mismatch between the noise component inherent at the receiver input and the regulatory noise increment.

---

The invention described herein may be manufactured and used by or for the United States Government for governmental purposes without payment to me of any royalty thereon.

This invention relates to microwave receiver circuitry, and, more particularly, to a feedback-stabilized radiometer.

The instant invention has utility in radio astronomy, namely in apparatus adapted to pick up signals radiated by celestial bodies ("radio stars") as they appear, periodically, within the pick-up zone.

Very accurate measurements are required in radio astronomy. When accuracies of less than 1° K. are required, any gain drift whatsoever in the receiver or coherent detector will be reflected as an error in the indicated input temperature. A gain change of 1 db any place in the amplifier drain could easily result in a temperature error of 10° K. This stability problem necessitates frequent calibration of the system with no guarantee that the gain has remained stable between calibrations since unpredictable gain changes may occur due to environmental effects.

To prevent errors due to drift in gain, some prior art radiometers have self-calibration systems. At frequent intervals during operation a known standard noise source is switched on in place of the antenna. This source must be at a different temperature than the reference load; it is usually kept at liquid nitrogen temperature if the reference load is at room temperature. The system has disadvantages. First, data is lost while the calibration source is on. Second, if drift has occurred, the operator must apply a correction to the data. The time and slope of this correction is uncertain.

Another prior art method of overcoming instability is to use a manual null output system. The noise power from the antenna is added in a directional coupler to that from a variable noise source. The variable source consists of a standard noise source in cascade with a calibrated variable attenuator. By adjusting the attenuator it is possible to add enough noise power to that of the antenna so that the sum will equal the noise power from the reference load. The operator can null the radiometer output by adjusting the variable attenuator. The method has a drawback in that the response of the operator is neither fast, accurate, nor predictable. Thus, it is satisfactory only when constant or very slowly varying noise is being observed.

Another prior are system is the gain-modulated radiometer, which is similar to the Dicke radiometer except that the receiver gain is modulated by the comparison switch drive signal. Gain is reduced during the time the comparison switch is looking at the higher noise level. The effect on the output of receiver drift is also reduced but drift effects are in no way eliminated.

The systems, above-mentioned afford some improvement in stability but merely reduce and cannot completely eliminate errors due to drift in receiver gain.

Accordingly, a primary object of this invention is to provide an ultrastable microwave radiometer that eliminates errors due to gain drift to achieve long-term absolute stability.

Another object of this invention is to provide a microwave radiometer wherein the microwave receiver and the coherent detector are in a servo loop and thus rendering the radiometer calibration independent of gain changes in said two units.

Still another object of this invention is to provide microwave radiometer apparatus whose calibration depends on the value of attenuation and not on the gains of the system.

And still another object is to provide microwave radiometer apparatus amenable to automatic operation.

A still further object of this invention is to provide an ultrastable microwave radiometer containing feedback apparatus whose magnitude is adjustably controlled by the output of a coherent detector.

To the accomplishment of the foregoing and other objects, the instant invention achieves radiometer stability by including the unstable portions of the radiometer in a Type I servo feedback loop. The input signal is fed into a directional coupler where it is added to a servo-controlled noise power. The output of the directional coupler is then routed to a microwave switch where it is compared with the noise power of a reference load. The noise power at the input to a microwave receiver is modulated by the switch. The amplitude of this modulation is a function of the difference between the effective noise temperature at the output port of a directional coupler and the temperature of a reference load. This modulated noise is then amplified and detected by the receiver. The receiver output is then fed to the "signal" channel of a coherent detector where it is correlated with the switch drive frequency. The operation of the coherent detector is such as to produce a positive voltage for components of the signal in phase with the reference and a negative voltage for components of the signal out of phase with the reference. This detector output voltage is then used as the input to a servo amplifier and reversible motor which positions a variable attenuator in the line between a standard noise source and a second input port of the directional coupler. The variable attenuator varies the effective noise temperature at this second input port. The directional coupler then combines the noise power due to the input temperature with the effective noise temperature to give a resultant noise power at the output port. The servo loop continues to drive the attenuator in such a manner as to deliver an effective noise power, which when combined in the directional coupler with the input noise, produces a resultant noise power equal to that of the room temperature load. By holding the standard noise source constant, a particular attenuator position corresponds to a particular input temperature. The output of a potentiometer connected to the attenuator shaft is a voltage which is recorded as attenuator shaft position. In this way the magnitude of the equivalent temperature of an incoherent source is represented continuously by a voltage and may be recorded. Thus, by including the microwave receiver and coherent detector in a feedback loop it is possible to assure radiometer gain stability by maintaining a stable linear potentiometer potential.

The above and other objects, features and advantages of the present invention will be more fully understood from the following description considered in connection with the accompanying drawings in which:

FIGURE 1 is a simplified block diagram of the instant feedback stabilized radiometer;

FIGURES 2a and 2b illustrate the waveforms at the input and output respectively of the microwave receiver;

FIGURES 3a and 3b illustrate the coherent detector output and reference signals in phase.

Figure 4:
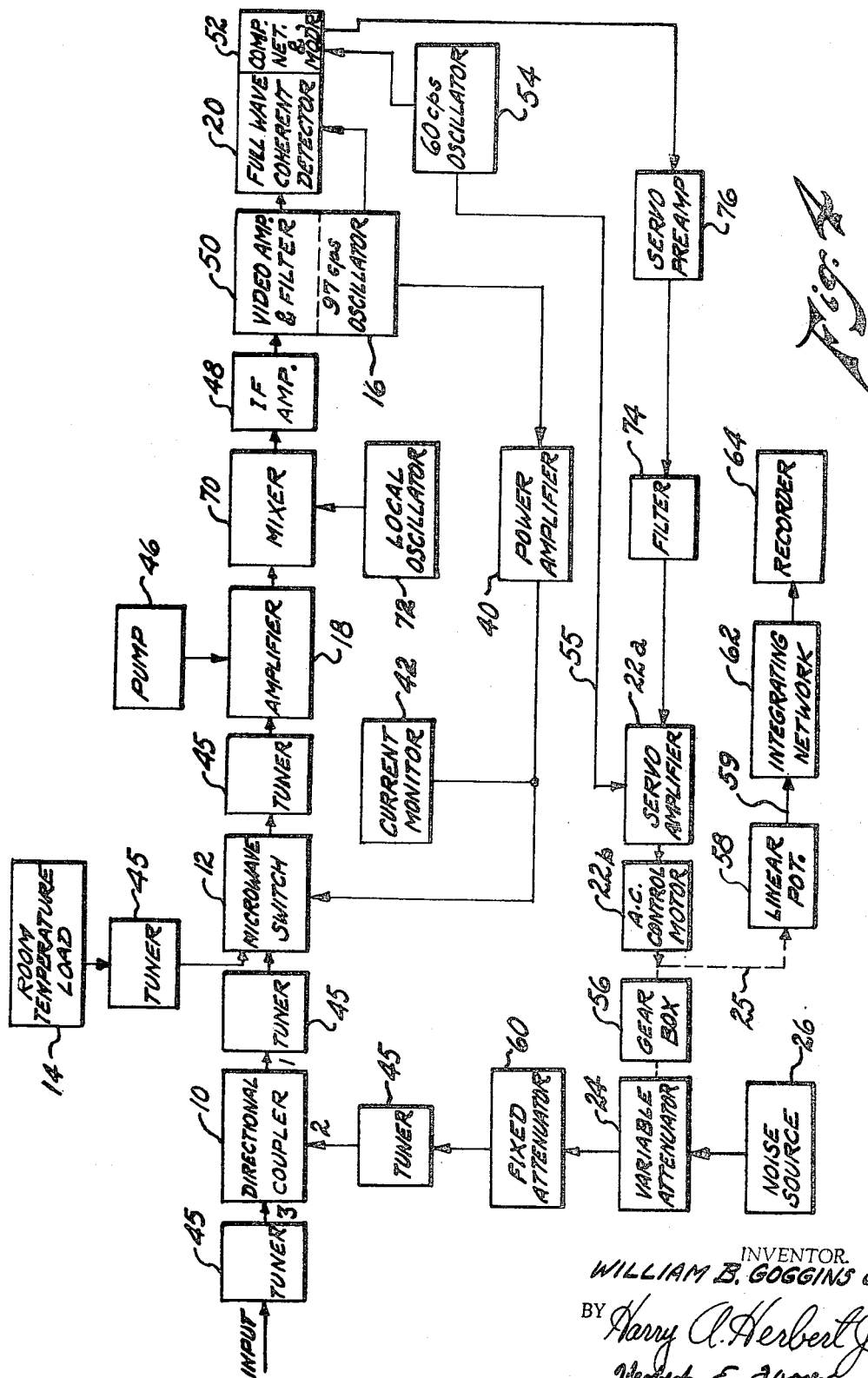
FIGURE 4 is a complete block diagram of a preferred embodiment.

A general explanation of the operation of the instant feedback radiometer may be understood by referring to FIGURE 1 which shows the system in simplified block diagram form.

The input to the radiometer is through port 3 of directional coupler 10. The output of directional coupler 10, through port 1, is a fraction of the noise power appearing at port 3 plus a fraction of the noise power at port 2. This output is compared by microwave switch 12 with the noise power of reference load 14, which is at room temperature.

Switch 12 is driven at 97 c.p.s. by audio oscillator 16. Switch output 13 is amplified and detected by microwave receiver 18. If there is any difference between the noise power from port 1 of directional coupler 10 and that of room temperature load 14, the waveform of FIGURE 2a is the result. The receiver output shown in FIGURE 2b is a square wave at the switch frequency with any noise frequencies not high enough to be filtered by detector 20 superimposed. Detector 20 is essentially a phase sensitive demodulator with the switch drive voltage used as a reference. Video output 19 of receiver 18 contains a coherent 97-c.p.s. component that produces a DC output 21 from cohererent detector 20. The sign of DC output 21 depends on whether the 97-c.p.s. input of coherent detector 20 is in or out of phase with the reference signal from audio oscillator 16. The magnitude of DC output 21 (see FIGURES 3a and 3b) depends on both the amplitude and phase of the signal if the reference is held constant in phas and amplitude. The DC output of coherent deterctor 20 is sensed by servo amplifier and motor 22, which then drives attenuator 24 in order to change the noise power at port 2 of directional coupler 10. By holding standard noise source 26 constant, a particular position of variable attenuator 24 corresponds to a particular input temperature. The action of attenuator 24 on noise source 26 is to lower the effective temperature. Thus by varying the attenuation in the line the effective noise temperature at port 2 of coupler 10 may be varied. The noise power at port 2 is thus varied so that when it is combined with the noise power at port 3, the resulting output noise power at port 1 will equal that of reference load 14. The position of variable attenuator 24 is thus a known function of the input signal. This position is sensed electrically by a potentiometer (shown in FIGURE 4) whose output is fed into an integrating network. The time constant of this network determines the time constant of the radiometer.

A more detailed explanation may be understood by now referring to FIGURE 4 which is a complete block diagram of a preferred embodiment designed to operate at 1.395 K. mc. in conjunction with radio stars such as Cygnus A and Cassiopeia A to plot the far field antenna pattern of a fixed position multiplate antenna and to measure noise and gain level. Most of the units are commercially available.

The input to the radiometer is fed into a 10-db directional coupler where it is added to the servo-controlled noise power. Any directional coupler with a suitable power division ratio may be used. The output of directional coupler 10 is then routed to one terminal of singlepole double-thrown ferrite switch 12 where it is compared with the noise power of room temperature load 14. A matched 50 ohm load, Microlab TN50M, was used as a room temperature noise source; however, any matched load can be used. Ferrite switch 12 is driven at 97 c.p.s. by 20-w. power amplified 40. Any ferrite or varactor or mechanical switch with VSWR below 2.0 may be used. In order to insure that the reactance of the switch remains constant, the switch current is monitored by an AC milliammeter 42 because it was found that the switch VSWR is dependent on drive current.

If any mismatch, namely, if a VWSR is present at some point in the microwave circuitry, it will produce a reflected noise temperature variation. This reflected noise power produces an error in the radiometer output. Although such errors can be calibrated out of the system they may cause inflection points in the calibration curve and render the calibration inaccurate. The five stub tuners 45 in the RF section makes the VSWR as close to 1 as possible and thus serve to match out any VSWR that may exist as critical points in the microwave circuitry.

Parametric amplifier 18 used in the preferred embodiment is a Microwave Technology Model L501, which has a nominal gain of 17 db, a bandwidth of 15 mc. s. and a noise figure of 2.5 db. The amplifier is pumped by unit 46 comprising a klystron stabilizer in frequency by a Triconix klystron stabilizer. It is to be noted however that the parametric amplifier is required only if high accuracy is required. (Although the pump was frequency-modulated by the klystron stabilizer of a 10-kc. s. rate, there seemed to be no adverse effects on the operation of the parametric amplifier or of the radiometer.)

An I band microwave mixer 70, Empire Devices CM107C, is used as the frequency converter. Any low noise mixer of the proper frequency may be used. Local oscillator 72 is an FXR L772A, however any oscillator meeting power and frequency requirements may be substituted.

IF amplifier 48 is adjusted for a bandwidth of 4.5 mc. s. and a center frequency of 30 mc. s. Any suitable IF amplifier system could be used.

Video amplification and 97-c.p.s. filtering are provided by sections of Triconix CK2 radiometer conversion unit 50. The 97-c.p.s. oscillator signal available in this unit is used as a signal for amplifier 40 driving switch 12 and also as a reference for fullwave coherent detector 20. Any suitable amplifier-filter combination and audio oscillator could be substituted.

The necessary freedom from drift is obtained with phase-sensitive detector 20. This unit is not as subject to drift as a detector using amplifies because no amplification is involved. In addition, the output is a full-wave rectified signal rather than a half-wave signal.

Phase-sensitive detector 20 is followed by balanced, integrating network 52 with a time constant of 10 sec. A 1.2 megohm, 10 μfd. RC integrating network is used both for compensation and for filtering the 97 c.p.s. component and its harmonics which result from the full wave rectification of the signal. At the output of this integrating network there is a balanced DC cathode follower that is inserted for impedance-matching. The output of the cathode follower is connected to a lead (proportional plus derivative) network with a time constant of 1 sec. This lead network provides the necessary compensation for the servo system. A 60-c.p.s. chopper then converts this balanced signal to AC, which is fed via lead 55 into the signal channel of servo amplifier 22a. A mechanical chopper of the Airpax 175 type driven by a Hewlett-Packard 205A audio oscillator was used as the 60 cycle modulator. However, any drift-free modulation system may be used. The 60-c.p.s. chopper driving signal is used as a reference for the servoamplifier. It is to be noted that the time constants chosen were found to be suitable for the servomotor-attenuator combination used. However, any suitable time constants for a given servomotor-attenuator combination may be used.

Servoamplifier 22a powers servomotor 22b. Amplifier 22a consists of two push-pull 12 watt stages with a phase shifting network in front of one stage. The phase shift network permits adjustment of the phase of the signal channel. Any dual channel audio amplifier of the proper voltage with output impedance matched to AC control motor 22b could be used.

Filter 74 is a 60 c.p.s. filter and consists of a cathode coupled amplifier with a twin T notch filter used in negative feedback. Any suitable filter of the proper frequency may be used. AC control motor 22b is a Diehl motor developing 0.9 watt output.

Gear box 56 consisting of a worm and bull gear and having a ratio of 100:1 is placed between the motor and the variable attenuator. Variable attenuator 24 is a continuously variable precision attenuator. Attenuation is varied by rotating the micrometer shaft, which is coupled to the output shaft of gear box 56. Connected to attenuator drive shaft 25 is a 10-turn 100-kilohm linear potentiometer 58. The reference for this pot is provided by a heavy duty drycell. A 3 db fixed attenuator 60 placed in the line with variable attenuator 24 serves two purposes: (1) it allows the variable attenuator to operate over a more linear portion of its range; (2) it helps to minimize the error due to VSWR differences over the operating range of the variable attenuator. Standard noise source 26 simulates a load at 10,100° K. Any standard noise source could be used.

The output of potentiometer 58 is connected to unit 62 containing an integrating network and a DC amplifier. The purpose of integrating network 62 is to provide averaging of potentiometer output 59 in order to filter out any system noise. The integrating network provides the overall radiometer time constant of 18 sec. Its output is connected to a balanced cathode follower. The cathode follower provides impedance-matching between the integrating network and recorder 64, balances the output to the recorder, and offers a convenient means for adjusting the DC zero to the recorder. The DC level adjustment is provided by the variable reference voltage at the grid of a triode. Power for this unit is obtained from heavy-duty drycells for B+ and by regulated filament voltage.

It should be noted that for any point where DC signals are present, the circuits used were chosen for their drift-free characteristics. Any gain losses incurred by using this circuitry are then made up by amplification in the AC channel, which is not subject to drift.

An analysis of the instant radiometer feedback system has been made with respect to gain stability, signal-to-noise ratio, loop response and RMS noise fluctuation. This analysis is described in detail in my report entitled "An Ultrastable Microwave Radiometer" published in September 1964 and identified as AFCRL–64–736. Because FIGURE 1 shows a Type 1 system, that it, pure integration in the forward part of the loop, there is no steady-state error in the output if the input is constant. This is independent of the gain. Therefore, in spite of receiver gain changes the radiometer will maintain the same level after transients have died out. It can be further shown that the signal-to-noise ratio at the output is that at the input; it is also the same as that for a conventional radiometer. Thus, use of a servo loop has not adversely affected the signal-to-noise ratio of the radiometer. The natural frequency of the loop described in FIGURE 4 was found to be 3.2 rad./sec. with the gain constant set at 41.3; the bandwidth of the close loop is 6.8 rad./sec. This is the desired gain value. If the open loop gain drops by 3 db, the natural frequency of the closed loop will drop to 1.5 rad./sec. and the bandwidth will drop to 3.8 rad./sec. The system can tolerate a 3-db loss of gain in the said loop without seriously degrading the radiometer response.

The log magnitude and phase angle curves for the system show that the gain would have to be increased by 16 db, a factor of 5.9, for the system to be unstable. Thus, satisfactory system operation is obtained over a wide range of values of loop gain. The RMS noise fluctuation for the system was found to be 0.135 K.

From the above it will be seen inclusion of the microwave receiver and the coherent detector in a servo loop makes the calibration of the radiometer independent of gain changes in these units. The following advantages are obtained:

(1) Ease of calibration.

(2) Permanence of calibration—the calibration depends on the value of attenuation and not on the gains of the system. These attenuations are not subject to change except under extreme conditions.

(3) Ease of operation—once calibration has been performed no further adjustments nor calibrations are necessary except to insure proper current into the ferrite switch.

(4) With the feedback-stabilized radiometer no data reduction is necessary to take out the effects of drift.

(5) The feedback stabilized unit is amenable to automatic operation.

(6) The radiometer may be operated under field conditions; equipment temperatures and line voltages are no longer critical. Stability of frequency and phase at audio frequencies are the only critical parameters, and these are easily maintained with ordinary equipment.

The invention should not be considered to be limited to the apparatus disclosed herein. For example, another method of providing a variable noise source is to use a cold reference load in place of a room temperature reference load. The RF section of the radiometer may be simply modified for this purpose by balancing the variable noise power against the input noise power. Tests have shown that the use of a cold reference load reduces the drift due to variation in room temperature and reduces the RMS noise fluctuation at the radiometer output; however, the response of the servo loop is slightly underdamped. Or, a variable noise source could be provided by connecting a cold reference load to one arm of the directional coupler and by connecting an argon lamp in cascade with a variable attenuator to the other arm of the directional coupler; thus, the antenna could be connected directly to one input side of the microwave switch and the output of the directional coupler connected to the other input side of the switch. Also, the directional coupler can be completely eliminated by using a standard noise source (either "hot" or "cold") connected in cascade with a variable attenuator, with the antenna connected to one input side of the microwave switch and the output of the variable attenuator connected to the other switch input side. The speed of loop response, which is limited chiefly by the time constant of the motor driven attenuator, can be increased by lowering the time constant by using components with low inertia, by providing viscous damping, by providing a minor feedback loop around the motor-driven attenuator, or by using an electronically variable attenuator.

A plurality of receivers could be used. For example, the operation of a two-receiver radiometer is similar to the single-receiver radiometer. The switchable circulator is a four-port microwave switch which alternately switches the antenna between receiver A and receiver B, while at the same time switching the output of the variable attenuator to whichever receiver is not connected to the antenna. The two signals are then added together in a differential amplifier before going into the coherent detector. The servo adjusts the variable attenuator so the output of the coherent detector is a null. A two-receiver feedback radiometer has the following advantages: (1) stability for the same reason as the single-receiver radiometer; (2) sensitivity is better by a factor of $\sqrt{2}$; and (3) the receivers need not remain matched in gain.

It will be obvious to those skilled in the art that numerous changes, omissions, and additions may be made without departing from the scope of this invention.

What I claim is:

1. An ultrastable microwave radiometer comprising, in combination, an antenna responsive to radio signals radiated by celestial bodies, directional coupler means having a first, second and third port, said first port connected to said antenna, reference load means, microwave switching means adapted to alternately couple said coupler means and said reference load means to said microwave switching means output, microwave receiver means connected to the output of said switching means, coherent detector means connected to the output of said receiver means, servo motor means connected to the output of said coherent detector means, means to generate a noise signal, variable attenuator means connected to said servo motor means and connected in series with said noise signal generating means, the output from said variable attenuator means connected to the second port of said coupler means to provide a corrective noise movement whose magnitude is a function of any noise mismatch between the noise input from said coupler means and the noise input from said reference load means.

2. The apparatus as described in claim 1 wherein said reference load means is at room temperature.

3. The apparatus as described in claim 1 which further includes audio oscillator means connected to said switching means and connected to said coherent detector means to cause said coherent detector means to produce an output signal when there is any noise mismatch between the noise inputs from said coupler means and said reference load means.

4. The apparatus as described in claim 1 which further includes potentiometer means connected to said servo motor means, integrating network means connected to the output of said potentiometer means to provide a predetermined time constant for the operation of said radiometer, cathode follower means connected to the output of said integrating network means, and recording means connected to the output of said cathode follower means.

5. The apparatus as described in claim 1 which further includes fixed attenuator means connected in series between said variable attenuator means and the second port of said coupler means.

6. The apparatus as described in claim 1 which further includes a plurality of stub tuner means coacting with said coupler means and said microwave switching means to reduce any VSWR effects.

7. A feedback-stabilized microwave radiometer comprising an antenna responsive to radio signals radiated by celestial bodies, switching means having a first and second input, said antenna connected to said first switching input, directional coupler means having a first and second input port and a single output port, said output port connected to said second switching input, cold reference load means connected to said first input port, variable attenuator means, means to generate a noise signal connected in series with said attenuator means, the output of said attenuator means connected to said coupler means second input port, microwave receiver means connected to the output of said switching means, coherent detector means connected to the output of said receiver means, and servo motor means connected to the output of said detector means and connected to the input of said variable attenuator means.

References Cited

UNITED STATES PATENTS

| | | | |
|---|---|---|---|
| 3,167,714 | 1/1965 | Seling | 324—58.5 X |
| 3,210,663 | 10/1965 | Moseley et al. | 324—99 |
| 3,325,644 | 6/1967 | Frye et al. | 325—363 X |

RUDOLPH V. ROLINEC, *Primary Examiner.*

P. F. WILLIE, *Assistant Examiner.*